(12) United States Patent
Kim et al.

(10) Patent No.: US 10,809,961 B2
(45) Date of Patent: Oct. 20, 2020

(54) DISPLAY APPARATUS THAT CONNECTS DISPLAY MODULES AND METHOD FOR CONTROLLING THEREOF

(71) Applicant: SAMSUNG ELECTRONICS CO., LTD., Suwon-si (KR)

(72) Inventors: Sangwon Kim, Suwon-si (KR); Jeongryeol Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/554,117

(22) Filed: Aug. 28, 2019

(65) Prior Publication Data

US 2020/0073615 A1 Mar. 5, 2020

(30) Foreign Application Priority Data

Aug. 30, 2018 (KR) ........................ 10-2018-0102919

(51) Int. Cl.
*G06F 3/14* (2006.01)
*G06T 1/20* (2006.01)
*G09G 3/32* (2016.01)

(52) U.S. Cl.
CPC .......... *G06F 3/1438* (2013.01); *G06F 3/1446* (2013.01); *G06T 1/20* (2013.01);
(Continued)

(58) Field of Classification Search
CPC ....... G06T 1/20; G06F 3/1438; G06F 3/1446; G09G 3/32; G09G 2300/026; G09G 2330/022; G09G 2360/144
(Continued)

(56) References Cited

U.S. PATENT DOCUMENTS 9,797,999 B2 10/2017 Lee et al.
2005/0134525 A1 6/2005 Tanghe et al.
(Continued)

FOREIGN PATENT DOCUMENTS

EP 3 009 920 A1 4/2016
EP 3 499 903 A2 6/2019
(Continued)

OTHER PUBLICATIONS

International Search Report (PCT/ISA/210) dated Dec. 18, 2019 issued by the International Searching Authority in International Application No. PCT/KR2019/010851.
(Continued)

*Primary Examiner* — Jacinta M Crawford
(74) *Attorney, Agent, or Firm* — Sughrue Mion, PLLC

(57) ABSTRACT

A display apparatus includes a plurality of cabinets arranged adjacently to each other to provide a display screen, at least one sensor, and a main processor. Each cabinet of the plurality of cabinets includes a display module, a sub-processor configured to be activated in a stand-by mode, and a processor. A first sub-processor included in a first cabinet connected to the sensor, among the plurality of cabinets, is configured to, based on a signal being received from the sensor in the stand-by mode, activate a first processor in an inactivated state included in the first cabinet, and provide state information of the first processor to a second sub-processor included in a second cabinet that is adjacent to the first cabinet, and the second sub-processor is configured to activate the first processor using the state information in the stand-by mode.

18 Claims, 14 Drawing Sheets

(52) U.S. Cl.
CPC ......... *G09G 3/32* (2013.01); *G09G 2300/026* (2013.01); *G09G 2330/022* (2013.01); *G09G 2360/144* (2013.01)

(58) Field of Classification Search
USPC .................................................. 345/1.1, 1.3
See application file for complete search history.

(56) References Cited

U.S. PATENT DOCUMENTS

| | | | |
|---|---|---|---|
| 2011/0109608 A1 | 5/2011 | Kim | |
| 2014/0118305 A1 | 5/2014 | Jang et al. | |
| 2015/0091795 A1 | 4/2015 | Kang et al. | |
| 2016/0188278 A1* | 6/2016 | Lee | G09G 5/391 345/1.3 |
| 2016/0224306 A1 | 8/2016 | Rycyna, III et al. | |
| 2016/0231976 A1 | 8/2016 | Ryu et al. | |
| 2016/0306533 A1* | 10/2016 | Agarwal | G06F 3/04897 |
| 2016/0342373 A1 | 11/2016 | Huang et al. | |
| 2017/0084246 A1* | 3/2017 | Joshi | G09G 3/32 |
| 2018/0121060 A1 | 5/2018 | Jeong et al. | |
| 2019/0246172 A1 | 8/2019 | Cheong et al. | |

FOREIGN PATENT DOCUMENTS

| | | |
|---|---|---|
| KR | 10-2011-0049948 A | 5/2011 |
| KR | 10-2014-0017740 A | 2/2014 |
| KR | 10-2016-0022162 A | 2/2016 |
| KR | 10-2018-0049614 A | 5/2018 |
| WO | 2018/084482 A2 | 5/2018 |

OTHER PUBLICATIONS

Written Opinion (PCT/ISA/237) dated Dec. 18, 2019 issued by the International Searching Authority in International Application No. PCT/KR2019/010851.

Communication dated Jan. 3, 2020, issued by the European Patent Office in counterpart European Application No. 19193916.4.

* cited by examiner

DISPLAY APPARATUS THAT CONNECTS DISPLAY MODULES AND METHOD FOR CONTROLLING THEREOF

CROSS-REFERENCE TO RELATED APPLICATIONS

This application claims is based on and claims priority under 35 U.S.C. § 119 to Korean Patent Application No. 10-2018-0102919, filed on Aug. 30, 2018, in the Korean Intellectual Property Office, the disclosure of which is incorporated by reference herein in its entirety.

BACKGROUND

1. Field

The disclosure relates to a display apparatus and a method for controlling the display apparatus and, more particularly, to a display apparatus that connects a plurality of display modules and a method for controlling thereof.

2. Description of the Related Art

Recently, with the development of electronic technology, various electronic devices meeting consumer needs have been developed. For example, a large display device connecting a plurality of display modules has been developed, recently.

Such large display devices are connected to an external electronic device that provides an image signal, and a user may watch an image through the large display device by controlling the external electronic device.

As the size of an external electronic device increases, it becomes common that an external electronic device is installed at a space separate from the space where the display device is installed.

In this case, there is a problem in that a user may not control the external electronic device while watching the image through the display device.

SUMMARY

Provided are a display apparatus which is capable of controlling an external electronic device that is located at a separate space through a display apparatus, and a controlling method thereof.

In accordance with an aspect of the disclosure, there is provided a display apparatus including: a plurality of cabinets arranged adjacently to each other to provide a display screen, each cabinet of the plurality of cabinets including a display module, a sub-processor configured to be activated in a stand-by mode, and a processor; at least one sensor; and a main processor, wherein a first sub-processor included in a first cabinet connected to the at least one sensor, among the plurality of cabinets, is configured to, based on a signal being received from the at least one sensor in the stand-by mode, activate a first processor in an inactivated state included in the first cabinet, and provide state information of the first processor to a second sub-processor included in a second cabinet that is adjacent to the first cabinet, wherein the second sub-processor is configured to activate a second processor included in the second cabinet using the state information in the stand-by mode, and wherein the main processor is configured to, in a normal mode in which the processor included in each of the plurality of cabinets is activated, control the processor included in each of the plurality of cabinets to display an image corresponding to an image signal received from an external electronic device through the display module included in each of the plurality of cabinets.

The first sub-processor may be further configured to, based on a signal being received from the at least one sensor, convert the signal from low to high, and output the converted signal, and wherein the second sub-processor may be further configured to, based on the signal output by the first sub-processor being converted from low to high, activate the first processor.

The display apparatus may further include an interface, wherein the first cabinet may be connected to the external electronic device through the interface, and the first cabinet may be configured to provide the state information to the external electronic device through the interface so the external electronic device in an inactivated state is activated.

The first sub-processor may be further configured to, based on a signal output by the external electronic device being converted from low to high, activate the first processor.

The at least one sensor may include an infrared (IR) sensor, and wherein the first sub-processor may be further configured to, based on a signal for controlling the display apparatus being received through the IR sensor or a user being sensed in a vicinity of the display apparatus by the IR sensor, activate the first processor.

The at least one sensor may include an illuminance sensor, and wherein the first sub-processor may be further configured to receive a signal including brightness information in a vicinity of the display apparatus from the illuminance sensor and activate the first processor.

The main processor may be further configured to, based on the signal not being received from the at least one sensor for a predetermined time after the image is displayed, control the processors included in each of the plurality of cabinets to convert a mode of the display apparatus from the normal mode to the stand-by mode.

The first sub-processor may be further configured to, based on a signal for converting a mode of the display apparatus to a stand-by mode being received from the at least one sensor, inactivate the first processor, and provide state information of the first processor to the second sub-processor, and wherein the second sub-processor may be further configured to inactivate a second processor in an activated state included in the second cabinet using the state information.

The display apparatus may further include an interface, wherein the first cabinet may be connected to the external electronic device through the interface, and the first cabinet may be configured to provide the state information to the external electronic device through the interface so that the external electronic device in an activated state is inactivated.

The first sub-processor may be further configured to, based on a signal output by the external electronic device being converted from high to low, inactivate the first processor.

In accordance with another aspect of the disclosure, there is provided a controlling method of a display apparatus including a plurality of cabinets, each cabinet of the plurality of cabinets including a display module, a sub-processor, and a processor, the plurality of cabinets being arranged adjacently to each other to provide a display screen, the controlling method including: based on receiving a signal, from a sensor, by a first sub-processor included in a first cabinet connected to the sensor, among the plurality of cabinets, activating a first processor in an inactivated state included in the first cabinet, and providing state information of the first processor to a second cabinet that is adjacent to the first cabinet; activating a second processor in an inactivated state included in the second cabinet using the state information in a stand-by mode; and in a normal mode in which the processor included in each of the plurality of cabinets is activated, displaying an image corresponding to an image signal received from an external electronic device through the display module of each of the plurality of cabinets.

The method may further include converting, by the first sub-processor, based on a signal being received from the sensor, the signal from low to high, and outputting the converted signal, and activating, by the second cabinet, based on the signal output by the first sub-processor being converted from low to high, the first processor.

The method may further include connecting the first cabinet to the external electronic device, and providing the state information to the external electronic device so that the external electronic device in an inactivated state is activated.

The method may further include activating, by the first cabinet, based on a signal output by the external electronic device being converted from low to high, the first processor.

The sensor may include an infrared (IR) sensor, and the controlling method may further include: activating, by the first sub-processor, based on a signal for controlling the display apparatus being received through the IR sensor or a user being sensed in a vicinity of the display apparatus by the IR sensor, the first processor.

The sensor may include an illuminance sensor, and the controlling method may further include: receiving, by the first sub-processor, a signal including brightness information in a vicinity of the display apparatus from the illuminance sensor, and activating the first processor.

The method may further include based on the signal not being received from the sensor for a predetermined time after the image is displayed, converting a mode of the display apparatus from the normal mode to the stand-by mode.

The method may further include inactivating, by the first sub-processor, based on a signal for converting a mode of the display apparatus to a stand-by mode being received from the sensor, the first processor, and providing state information of the first processor to the second cabinet, and inactivating, by the second cabinet, the second processor in an activated state included in the second cabinet using the state information.

The method may further include connecting the first cabinet to the external electronic device, and providing the state information to the external electronic device so that the external electronic device in an activated state is inactivated.

The method may further include inactivating, by the first cabinet, based on a signal output by the external electronic device being converted from high to low, the first processor.

BRIEF DESCRIPTION OF THE DRAWING

The above and other aspects, features, and advantages of certain embodiments of the present disclosure will be more apparent from the following description taken in conjunction with the accompanying drawings, in which.

DETAILED DESCRIPTION

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

When it is decided that a detailed description for the known art related to the disclosure may unnecessarily obscure the gist of the disclosure, the detailed description will be omitted.

Embodiments of the disclosure will be described in detail with reference to the accompanying drawings, but the disclosure is not limited to embodiments described herein.

Hereinafter, embodiments will be described in detail with reference to the drawings.

Figure 1A:
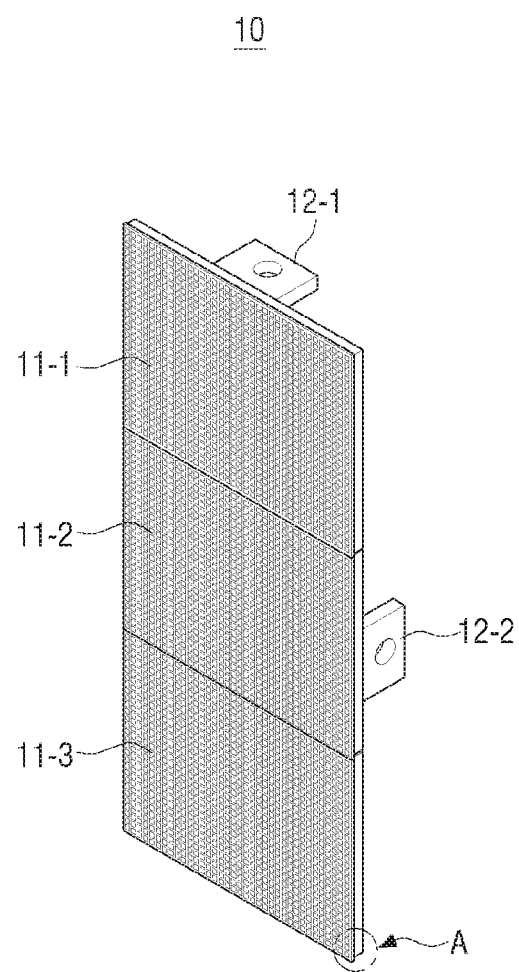
FIG. 1A is a view illustrating a cabinet, according to an embodiment.
Figure 1B:
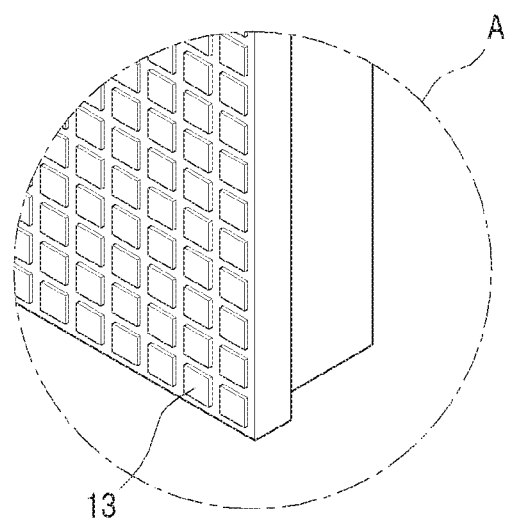
FIG. 1B is a view illustrating a cabinet, according to an embodiment.
Figure 1C:
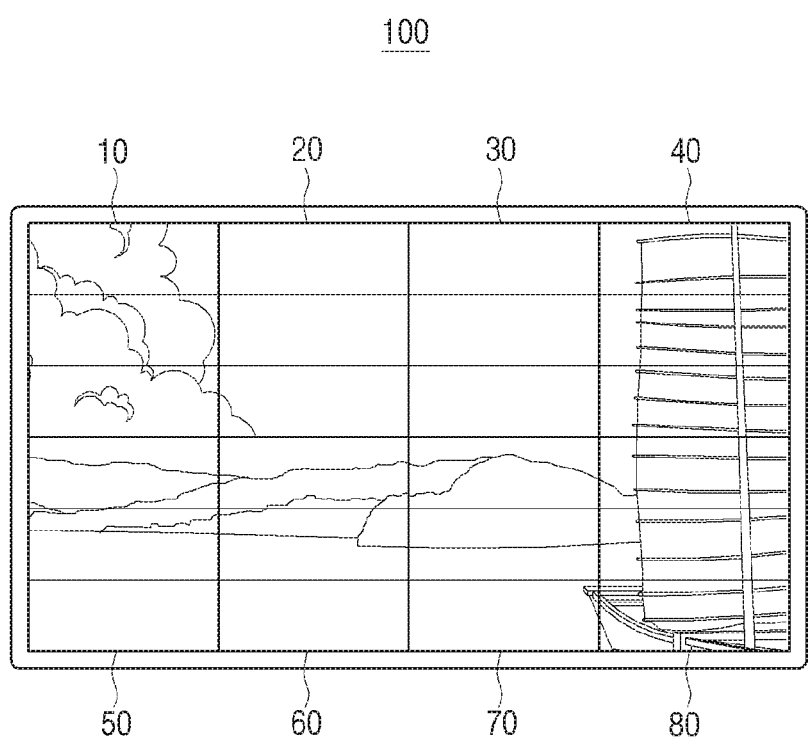
FIG. 1C is a view illustrating a cabinet, according to an embodiment.

FIGS. 1A, 1B, and 1C are views illustrating a cabinet according to an embodiment.

A cabinet 10 according to an embodiment may include at least one display module.

For example, referring to FIG. 1A, the cabinet 10 according to an embodiment may include three display modules 11-1, 11-2, and 11-3. Here, each display modules 11-1, 11-2, and 11-3 may be physically connected.

Each of the display modules 11-1, 11-2, and 11-3 may be implemented as a light emitting diode (LED) display module including LEDs.

Specifically, referring to FIG. 1B, as illustrated in magnified portion A, each of the display modules 11-1, 11-2, and 11-3 may be implemented as an LED display module that includes a plurality of LEDs 13 that implement red LED, green LED, and blue LED, which are sub-pixels, as one pixel.

Here, the plurality of pixels may be arranged in a matrix form (for example, M×N, where M and N are natural numbers). Specifically, the matrix may be in the same arrangement (e.g., M=N, where M and N are natural numbers, 16×16 format, 24×24 format, etc.), or may be another arrangement (e.g., M≠N, where M and N are natural numbers).

According to an embodiment, the LED of the LED display module may be implemented as a micro LED. Here, the micro LED may be an LED having a size about 5 to 100 micrometers, and may be a superminiature light emitting element that emits light by itself without a color filter.

However, the LED display module is merely an example, and the display module may be implemented as an organic LED (OLED), an active matrix OLED (AMOLED), a plasma display panel (PDP), or the like. Hereinafter, for convenience of description, it is assumed that the display module according to an embodiment is the LED display module.

Referring back to FIG. 1A, the cabinet 10 according to an embodiment may be implemented as a form in which the plurality of display modules 11-1, 11-2, and 11-3 are combined in a 1×3 format.

The LED display module in a 1×3 format is merely an example, and the arrangement format and the number of the LED display module may change in a diverse manner.

The cabinet 10 may include a base plate capable of mounting each of the display modules 11-1, 11-2, and 11-3. Here, the base plate may be implemented in a manner that each display module is mounted on a front surface of the base plate.

The cabinet 10 according to an embodiment may include a plurality of couplers 12-1 and 12-2 for coupling the cabinet 10 with one or more other cabinets. Accordingly, a plurality of cabinets according to an embodiment may be arranged to be adjacent to each other and configure a screen of the display apparatus.

For example, referring to FIG. 1C, the cabinet 10 according to an embodiment may be coupled with a plurality of other cabinets 20, 30, 40, 50, 60, 70, and 80 in a 4×2 format, and the modular display apparatus 100 such as a video wall may be implemented.

The modular display apparatus in a 4×2 format is only an embodiment, and the arrangement and the number of the cabinet may be changed in a diverse manner.

Figure 2:
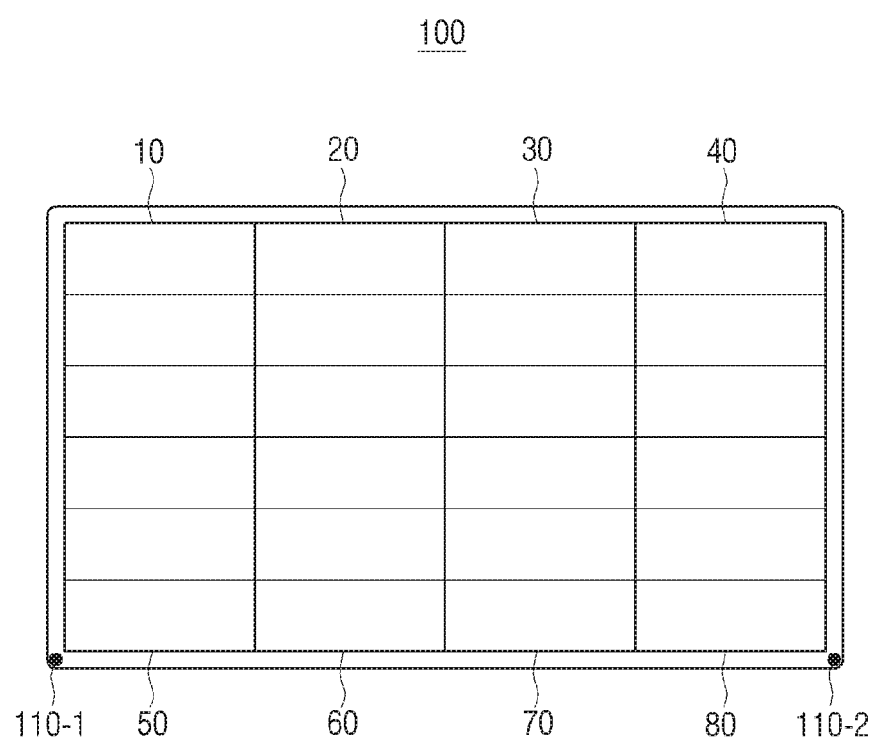
FIG. 2 is a view illustrating a sensor, according to an embodiment.

FIG. 2 is a block diagram illustrating a sensor according to an embodiment.

Referring to FIG. 2, the display apparatus 100 according to an embodiment may include at least one sensor, for example, a first sensor 110-1 and a second sensor 110-2.

Here, the at least one sensor may be an infrared (IR) sensor. To be specific, the sensor may be the IR sensor capable of receiving the IR signal.

Here, the IR signal may be a signal for controlling the display apparatus 100 or a signal for controlling an external electronic device for providing an image to the display apparatus 100. For example, when a user command for turning on or off the display apparatus 100 is input to a remote controller, a sensor may receive the IR signal from an IR transmitter of the remote controller.

The IR sensor may sense a user in the vicinity of the display apparatus 100. To be specific, the IR sensor may sense a user in the vicinity of the display apparatus 100 by sensing infrared rays of a specific wavelength that is emitted from the human body.

The IR sensor is merely an embodiment, and the sensor may be implemented as various sensors besides the IR sensor.

Specifically, the sensor may be a proximity sensor. Here, the proximity sensor is a sensor for sensing a user in the vicinity of the display apparatus 100 using an electromagnetic field, and may be implemented in various forms such as a high frequency oscillation type, a capacitance type, a magnetic type, an electro-optical type, an ultrasonic type, or the like.

The sensor may be an illuminance sensor for sensing illuminance in the vicinity of the display apparatus 100 and an accelerometer for sensing a motion of a user in the vicinity of the display apparatus 100.

In addition to the embodiments described above, a sensor may be implemented with various types of sensors such as a gyroscope sensor, a geomagnetic sensor, an ultrasonic sensor, a radio frequency (RF) sensor, or the like.

The sensor may be connected to at least one cabinet constituting the display apparatus 100.

For example, referring to FIG. 2, the first sensor 110-1 may be connected to a fifth cabinet 50 that is adjacently arranged, and the second sensor 110-2 may be arranged on an eighth cabinet 80 that is adjacently arranged.

Accordingly, the sensor may transmit the IR signal, or the like, as described above, to the connected cabinet.

As shown in FIG. 2, the sensor may be included in a lower bezel of the display apparatus 100. However, this is merely an example, and the sensor may be arranged at a position capable of receiving an IR signal from an external device such as a remote controller, a position capable of sensing a user in the vicinity of the display apparatus 100, and a position capable of sensing the illuminance in the vicinity of the display apparatus 100, or the like.

The sensor may be an external sensor separated from the display apparatus 100. In this case, the display apparatus 100 may receive various signals such as the IR signal, or the like, through communication with the sensor.

FIG. 2 illustrates two sensors 110-1 and 110-2, but this is merely an example, and the number of sensors is not limited thereto.

Figure 3:
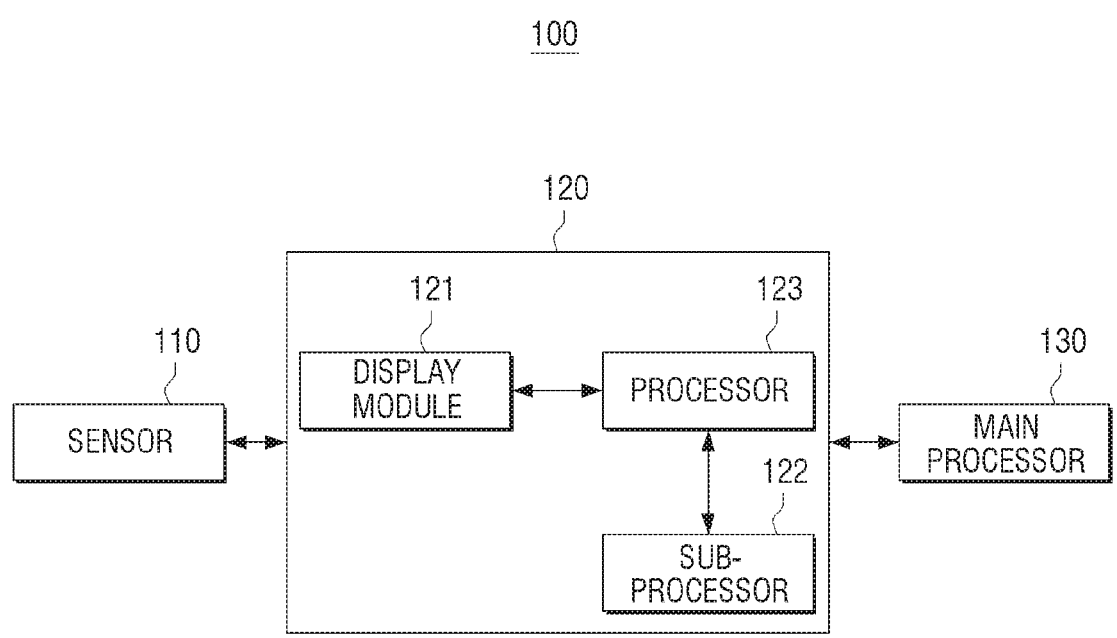
FIG. 3 is a view illustrating a display apparatus, according to an embodiment.

FIG. 3 is a view illustrating a display apparatus, according to an embodiment.

Referring to FIG. 3, the display apparatus 100 according to an embodiment includes a sensor 110, a cabinet 120, and a main processor 130. Herein, the cabinet 120 includes at least one display module 121, a sub-processor 122, and a processor 123.

FIG. 3 illustrates only one cabinet, but the display apparatus 100 according to an embodiment, as described above, may include a plurality of cabinets.

FIG. 3 illustrates only a cabinet connected to the sensor, but as described above, the display apparatus 100 according to an embodiment may include a cabinet not directly connected to the sensor.

The display module 121 may be included in each of a plurality of cabinets. As described above, the display module 121 may be an LED display module.

The sub-processor 122 may be included in each of the plurality of cabinets. The sub-processor 122 may be activated in a stand-by mode. Here, the stand-by mode means that the sensor 110 and the sub-processor 122 are in an activated state, and the display module 121 and the processor 123 are in an inactivated state. In the stand-by mode, the sub-processor 122 may receive a signal from the sensor 110.

The processor 123 may be included in each of the plurality of cabinets. Then, the processor 123 may be activated in the normal mode. Here, the normal mode means that the processor 123 is in an activated state. In the normal mode, the processor 122 may process an image signal received from an external electronic device to display an image through the display module 121, or display an image prestored in the display apparatus 100 through the display module 121.

The main processor 130 controls overall operations of the display apparatus 100. For this purpose, the main processor 130 may include one or more of a central processing unit (CPU), an application processor (AP), or a communication processor (CP).

The main processor 130 may control a processor 123 include in each of a plurality of cabinets. To be specific, in a normal mode in which the processor 123 included in each of the plurality of cabinets is activated, the main processor 130 may control the plurality of processors 123 to display an image corresponding to an image signal received from an external electronic device through each of the plurality of display modules, or control the plurality of processors 123 to display an image prestored in the display apparatus 100 through each of the plurality of display modules.

Below, an operation of the display apparatus 100 will be further described with reference to FIGS. 4 to 7.

Figure 4:
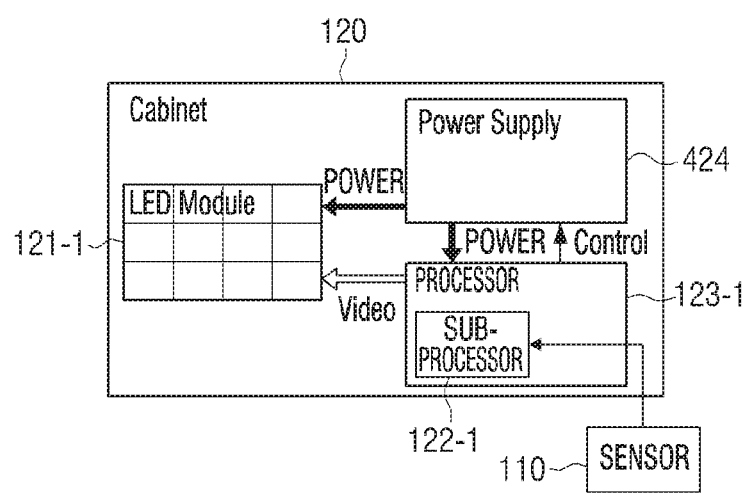
FIG. 4 is a view illustrating a cabinet connected to a sensor, according to an embodiment.

FIG. 4 is a view illustrating a cabinet connected to a sensor, according to an embodiment.

Referring to FIG. 4, the cabinet according to one embodiment may include an LED module 121-1, a power supply 424, a sub-processor 122-1, and a processor 123-1. Here, the LED module 121-1 may be the display module 121 of FIG. 3, the sub-processor 122-1 may be the sub-processor 122 of FIG. 3, and the processor 123-1 may be the processor 123 of FIG. 3. The power supply 424 may supply power to each part included in the cabinet.

The cabinet according to an embodiment may be connected to the sensor. To be specific, the sub-processor 122 included in the cabinet may be connected to the sensor 110. Accordingly, the sub-processor 122 may receive a signal from the sensor 110 in the stand-by mode.

The signal received from the sensor may be an IR signal as described above. Specifically, the signal received from the sensor may be an IR signal for controlling the display apparatus 100 or an IR signal for controlling an external electronic device providing the image to the display apparatus 100.

However, this is merely an example, and the signal received from the sensor may be various signals such as a signal including information on illuminance in the vicinity of the display apparatus 100, a signal including information of a user motion in the vicinity of the display apparatus 100, and the like.

In addition, the signal for controlling the display apparatus 100 may be an IR signal, or a wireless signal using a communication method such as Bluetooth, Wi-Fi, or the like. For this purpose, the display apparatus 100 may further include a Bluetooth chip, a Wi-Fi chip, or the like.

The sub-processor 122 may activate the processor 123 when a signal is received from the sensor. Specifically, the sub-processor 122 may activate the processor 123 by controlling the power supply 424 to supply power to the processor 123 when a signal is received from the sensor.

For example, when receiving a signal for turning on the power of the display apparatus 100 from the sensor 110, a signal for turning on an external electronic device connected to the display apparatus 100, a signal generated according to a user motion in the vicinity of the display apparatus 100, or a signal generated as the brightness around the display apparatus 100 is brightened by a predetermined value or more, the sub-processor 122 may control the power supply 424 to supply power to the processor 123, and activate the processor 123.

At this time, the sub-processor 122 may provide the state information of the processor 123 to a sub-processor included in the cabinet that is adjacently arranged. Hereinafter, this will be described with reference to FIG. 5.

Figure 5:
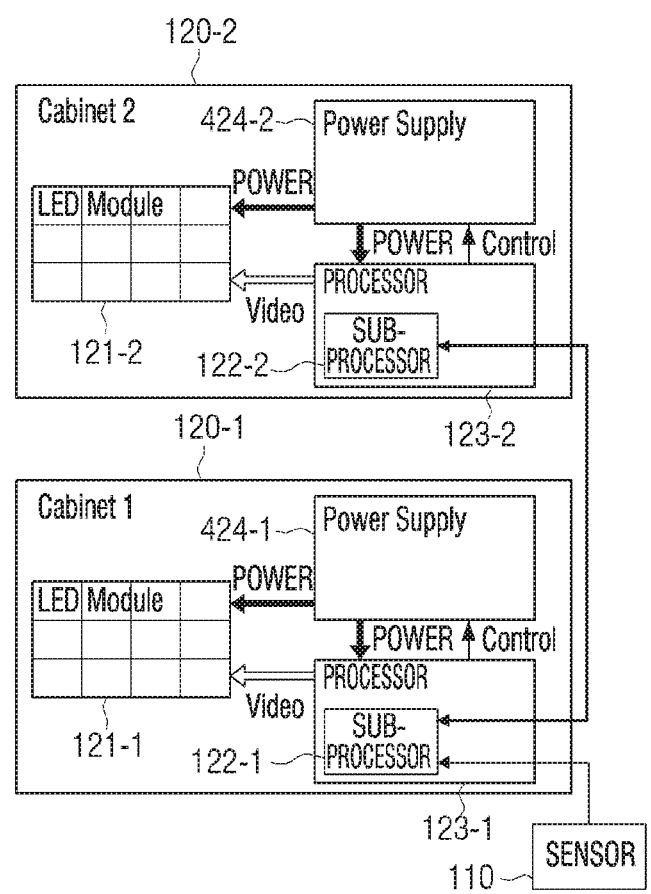
FIG. 5 is a view illustrating a method for providing state information of a processor by a sub-processor included in a cabinet to a sub-processor included in an adjacently arranged another cabinet, according to an embodiment.

FIG. 5 is a view illustrating a method for providing state information of a processor by a sub-processor included in a cabinet to a sub-processor included in an adjacently arranged another cabinet, according to an embodiment.

As illustrated in FIG. 5, a cabinet 1 (120-1) may include an LED Module 121-1, a sub-processor 122-1, a processor 123-1, a power supply 424-1. A cabinet 2 (120-2) may include an LED Module 121-2, a sub-processor 122-2, a processor 123-2, power supply 424-2.

Referring to FIG. 5, the sub-processor 122-1 included in cabinet 1 (120-1), connected to the sensor 110, is connected to a sub-processor 122-2 included in cabinet 2 (120-2) that is arranged adjacently, and may provide state information of the processor 123-1 included in cabinet 1.

Here, the state information of the processor may be a low signal or a high signal input by the sub-processor connected to the sensor.

To be specific, the sub-processor 122-1 included in cabinet 1 may output a low signal, when the processor 123-1 is in an inactivated state, and may output a high signal, when the processor 123-1 is in an activated state.

That is, the sub-processor 122-1 included in cabinet 1 (120-1) may output a low signal, when a signal is not received from the sensor, and may convert the low signal into the high signal and output the signal, when a signal is received from the sensor.

For this purpose, the sub-processor according to an embodiment may include a switch which is closed when a signal is received from the sensor, and is opened when a signal is not received from the sensor, and a circuit to output a low signal or a high signal according to opening and closing of the switch.

The sub-processor 122-2 included in cabinet 2 may determine whether the processor 123-1 included in cabinet 1 is in the activated state or the inactivated state based on whether the signal output by the sub-processor 122-1 included in cabinet 1 is a low signal or a high signal.

Specifically, if the signal output by the sub-processor 122-1 included in cabinet 1 is a low signal, the sub-processor 122-2 included in cabinet 2 may determine that the processor 123-1 included in cabinet 1 is in an inactivated state, and if the signal output by the sub-processor 122-1 included in cabinet 1 is a high signal, the sub-processor 122-2 included in cabinet 2 may determine that the processor included in cabinet 1 is in the activated state.

When the processor 123-1 included in cabinet 1 is determined to be in an inactivated state, the sub-processor 122-2 included in cabinet 2 maintains the inactivated state of the processor 123-2 included in cabinet 2, and when the processor 123-1 included in cabinet 1 is determined to be in the activated state, the sub-processor 122-2 included in cabinet 2 may activate the processor 123-2 included in cabinet 2 in the inactivated state.

To be specific, the sub-processor 122-2 included in cabinet 2, when it is determined that the processor 123-1 included in cabinet 1 is in the activated state, may control the power supply 424-2 to supply power to the processor 123-2 included in cabinet 2, thereby activating the processor.

Accordingly, when the processor 123-1 included in cabinet 1 is activated, the processor 123-2 included in cabinet 2 may be activated as well.

The sub-processor 122-1 included in cabinet 1 may provide state information of the processor 123-1 to an external electronic device connected to cabinet 1. Hereinafter, it will be described with reference to FIG. 6.

Figure 6:
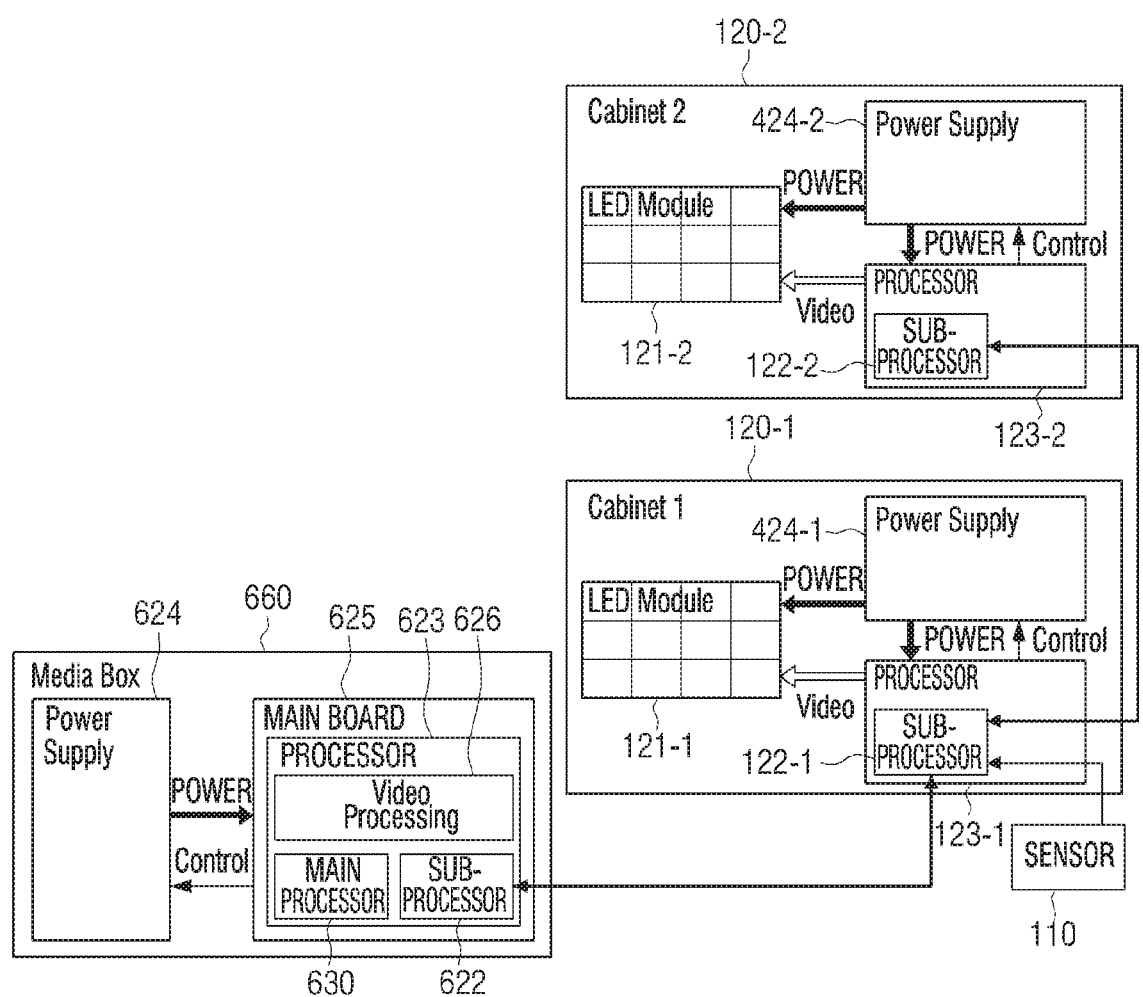
FIG. 6 is a view illustrating a method for providing state information of a processor by a sub-processor included in a cabinet to an external electronic device, according to an embodiment.

FIG. 6 is a view illustrating a method for providing state information of a processor by a sub-processor included in a cabinet to an external electronic device, according to an embodiment.

Referring to FIG. 6, the sub-processor 122-1 included in cabinet 1 connected to the sensor is connected to the sub-processor included in an external electronic device, and may provide the state information of the processor 123-1 included in cabinet 1.

For this purpose, the display apparatus 100 may further include an interface connected to an external electronic device. Here, the interface may be a high-definition multimedia interface (HDMI) input terminal, a component input terminal, a PC input terminal, a USB input terminal, or the like. In addition, the display apparatus 100 may be connected to an external electronic device through optical fibers.

Referring to FIG. 6, cabinet 1 may be connected to an external electronic device 660 through the interface. The external device may include a sub-processor 622, a processor 623, a power supply 624, a main board 625, a video processing 626, and a main processor 630.

The external electronic device 660 may be a device for providing an image to a display apparatus. For example, the external electronic apparatus may be an apparatus that processes an image signal received from an external server such as a set-top box and transmits the processed image signal to the display apparatus 100. Alternatively, the external electronic device may be a device connected to the set-top box, for processing the image signal received from the set-top box and transmitting the processed image signal to the display apparatus 100.

The state information of the processor may be a low signal or a high signal output by the sub-processor connected to the sensor.

As described above, when the processor 123-1 is in an inactivated state, the sub-processor 122-1 included in cabinet 1 may output a low signal, and when the processor 123-1 is in an activated state, the sub-processor 122-1 may output a high signal.

That is, when a signal is not received from the sensor 110, the sub-processor 122-1 included in cabinet 1 may output a low signal, and when a signal is received from the sensor 110, the sub-processor 122-1 may convert a low signal to a high signal and output the converted signal.

The sub-processor 622 included in the external electronic device 660 may, based on whether the signal output by the sub-processor 122-1 included in cabinet 1 is a low signal or a high signal, determine whether the processor 123-1 included in cabinet 1 is in an activated state or an inactivated state.

Specifically, when the signal output by the sub-processor 122-1 included in cabinet 1 is a low signal, the sub-processor 622 included in the external electronic device determines that the processor 123-1 included in cabinet 1 is in the inactivated state, and if the signal output by the sub-processor 122-1 included in cabinet 1 is a high signal, the sub-processor 122-1 may determine that the processor contained in cabinet 1 is in an activated state.

When it is determined that the processor 123-1 included in cabinet 1 is in an inactivated state, the sub-processor 622 included in the external electronic device may maintain the inactivated state of the processor 623 included in the external electronic device, and if it is determined that the processor 123-1 included in cabinet 1 is in the activated state, the sub-processor 622 may activate the processor 623 in the inactivated state included in the external electronic device.

To be specific, when it is determined that the 123-1 processor included in cabinet 1 is in the activated state, the sub-processor 622 included in the external electronic device may control the power supply 624 to supply power to the processor 623 included in the external electronic device and activate the processor 623.

Accordingly, when the processor 123-1 included in cabinet 1 is activated, the processor 623 included in the external electronic device may be activated as well.

The sub-processor 622 included in the external electronic device is connected to a cabinet connected to the external electronic device, and may provide state information of the processor. Hereinafter, the description will be given with reference to FIG. 7.

Figure 7:
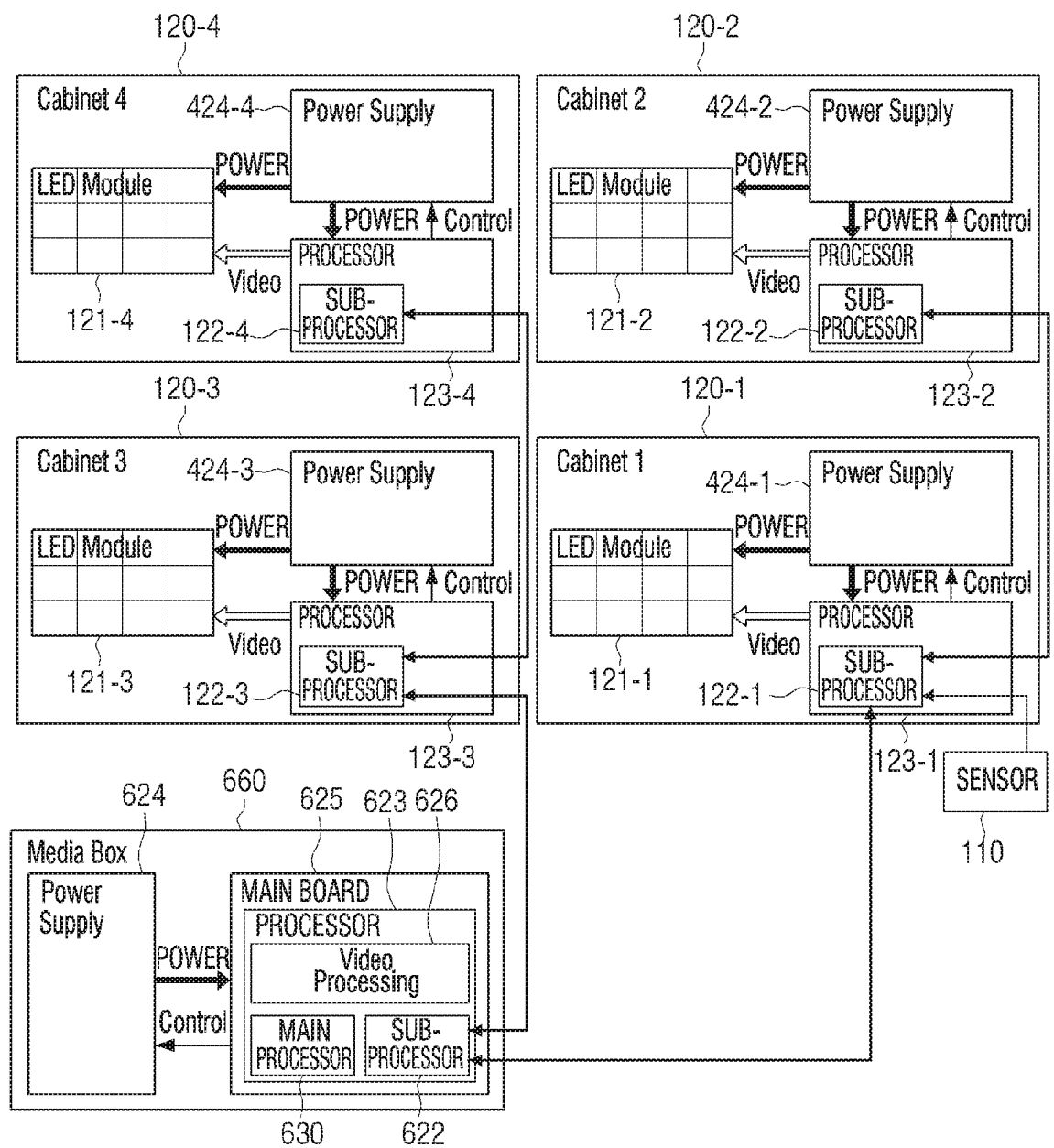
FIG. 7 is a view illustrating a method for providing state information of a processor to a cabinet by a sub-processor included in an external electronic device, according to an embodiment.

FIG. 7 is a view illustrating a method for providing state information of a processor to a cabinet by a sub-processor included in an external electronic device according to an embodiment. As illustrated in FIG. 7, a cabinet 3 (120-3) may include an LED Module 121-3, a sub-processor 122-3, a processor 123-3, a power supply 424-3. A cabinet 4 (120-4) may include an LED Module 121-4, a sub-processor 122-4, a processor 123-4, a power supply 424-4.

Referring to FIG. 7, the sub-processor 622 included in the external electronic device 660 may be connected to a sub-processor 122-3 included in cabinet 3 (120-3) connected to the external electronic device 660, and may provide state information of the processor 623 included in the external electronic device. The sub-processor 622 included in the external electronic device may be connected to a sub-processor 122-1 included in cabinet 1 connected to the external electronic device, and may provide state information of the processor 623 included in the external electronic device.

For this purpose, the external electronic device 660 may be connected to cabinet 1 and cabinet 3 through the interface.

The state information of the processor 623 may be a low signal or a high signal output by the sub-processor 622 included in the external electronic device.

To be specific, the sub-processor 622 included in the external electronic device may, when the processor 623 is in an inactivated state, output a low signal, and when the processor 623 is in an activated state, may output a high signal.

The sub-processor 122-3 included in cabinet 3 may, based on whether the signal output by the sub-processor 622 included in the external electronic device is a low signal or a high signal, determine whether the processor 623 included in the external electronic device is in an activated state or an inactivated state.

Specifically, when the signal output by the sub-processor 622 included in the external electronic device is a low signal, the sub-processor 122-3 included in cabinet 3 may determine that the processor 623 included in the external electronic device is in the inactivated state, and if the signal output by the sub-processor 622 included in the external electronic device is a high signal, the sub-processor 622 may determine that the processor 623 included in the external electronic device is in an activated state.

When it is determined that the processor 623 included in the external electronic device is in an inactivated state, the sub-processor 122-3 included in cabinet 3 may maintain the inactivated state of the processor 123-3 included in cabinet 3, and when it is determined that the processor 623 included in the external electronic device is in an activated state, the sub-processor 122-3 may activate the processor 123-3 in the inactivated state included in cabinet 3.

To be specific, when it is determined that the processor 623 included in the external electronic device is in an activated state, the sub-processor 122-3 included in cabinet 3 may control the power supply 424-3 to supply power to the processor 123-3 included in cabinet 3, and activate the processor 123-3.

Accordingly, when the processor 623 included in the external electronic device is activated, the processor 123-3 included in cabinet 3 may be activated as well.

The sub-processor 122-4 included in cabinet 4 may activate the processor 123-4 included in cabinet 4 based on a signal output by the sub-processor 122-3 of cabinet 3, in the similar manner as the sub-processor 122-2 included in cabinet 2 as described above.

Through this method, when the processor 123-1 included in the cabinet connected to the sensor 110 is activated, a plurality of processors included in the display apparatus 100 are activated, and the display apparatus 100 may be operated in a normal mode in which an image may be provided through a screen. That is, the display apparatus 100 may process an image signal received from an external electronic device and may be a state to display an image through a plurality of display modules.

As such, the display apparatus 100 according to an embodiment may be operating in a stand-by mode, when a signal is not received from the sensor, thereby reducing load of the processor.

In order to convert the mode of the display apparatus 100 from the stand-by mode to the normal mode, a user may input a control command to the display apparatus 100 without a need to input a control command to the external electronic device located in a separate space, and thus, a user convenience can be improved.

The display apparatus 100, according to an embodiment, when the mode of the display apparatus 100 is converted from the normal mode to the stand-by mode, may perform the method similar to the above method.

Specifically, the sub-processor included in the cabinet connected to the sensor may, when a signal to convert a mode of the display apparatus to a stand-by mode is received from the sensor, inactivate the processor in the activated state, and provide the state information of the processor to the sub-processor included in the cabinet that is adjacently arranged.

That is, the sub-processor included in the cabinet connected to the sensor may inactivate the processor in the activated state, convert the high signal which is being output to the low signal, and output the converted signal.

Accordingly, the sub-processor included in the cabinet adjacently arranged to the cabinet connected to the sensor may inactivate the activated processor included in the cabinet, based on the sub-processor included in the cabinet connected to the sensor outputting the low signal.

The cabinet connected to the sensor may be connected to the external electronic device through the interface, and so that the external device in an activated state to be inactivated, the state information of the processor may be provided to an external electronic device through the interface.

That is, the sub-processor included in the cabinet connected to the sensor may inactivate the processor in the activated state, convert the high signal which is being output to the low signal, and output the converted signal.

Accordingly, the sub-processor included in the external electronic device may inactivate the processor in the activated state included in the external electronic device, based on the sub-processor connected to the sensor outputting a low signal.

The sub-processor included in another cabinet connected to the external electronic device through the interface may inactivate the processor in the activated state included in the cabinet, based on the signal output by the external electronic device from the high signal to the low signal.

As such, the display apparatus 100 according to an embodiment, even when a mode of the display apparatus 100 is converted from the normal mode to the stand-by mode, may input a control command to the display apparatus 100, without a need to input a control command to the external electronic device located at a separate space. Thus, a user convenience can be improved.

Figure 8:
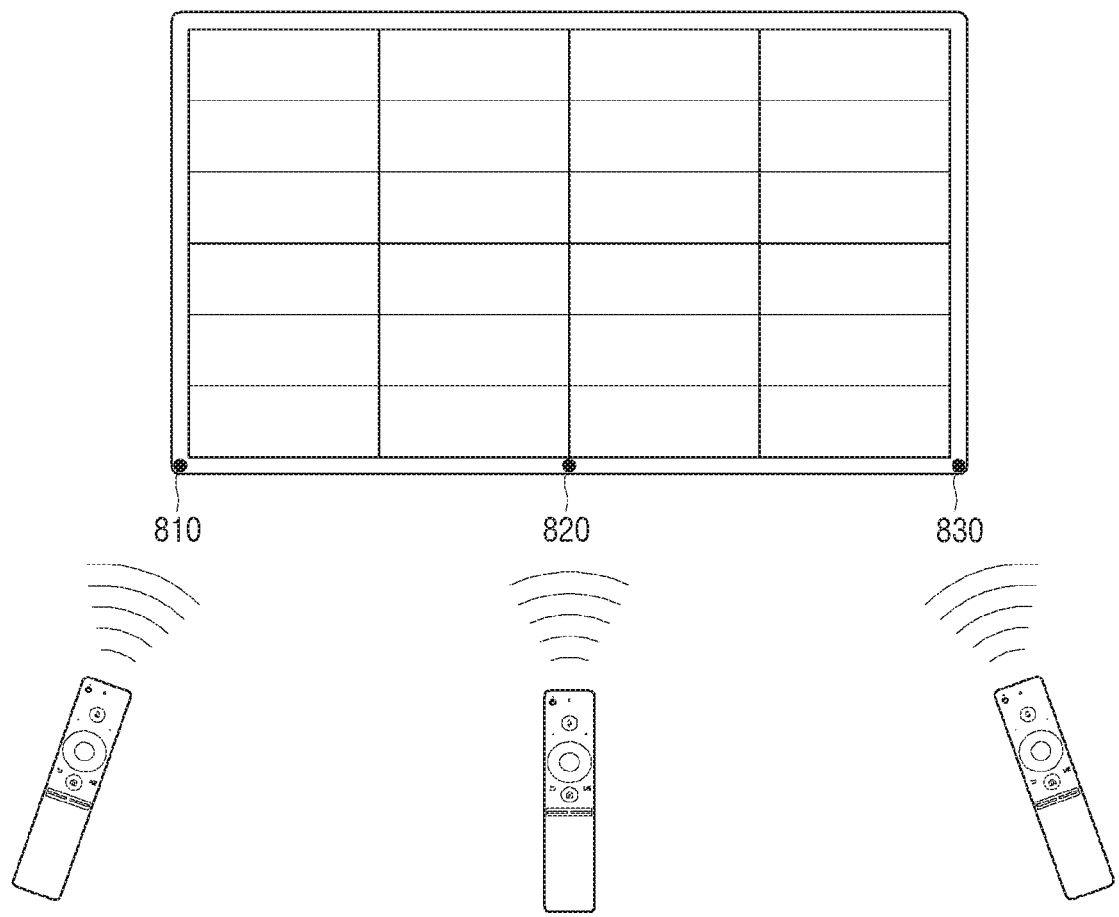
FIG. 8 is a view illustrating controlling a display apparatus, according to an embodiment.

FIG. 8 is a view illustrating controlling a display apparatus, according to an embodiment.

Referring to FIG. 8, the display apparatus 100 may include a plurality of IR sensors 810, 820, and 830.

Here, each of the plurality of IR sensors may be arranged at different positions. For example, as illustrated in FIG. 8, a first IR sensor 810 may be arranged at a bottom left corner region in a bezel of the display apparatus 100, and a second IR sensor 820 may be arranged at a bottom center region in a bezel of the display apparatus 100, and a third IR sensor 830 may be arranged at a bottom right corner region in a bezel of the display apparatus 100.

Considering that the display apparatus 100 according to an embodiment may be implemented as a large display apparatus, by arranging a plurality of IR sensors at different regions, a user may have an effect to transmit a signal, to the display apparatus 100, for effectively controlling the display apparatus 100 at any region in the vicinity of the display apparatus 100.

While the display apparatus 100 is operating in the stand-by mode, when a signal for controlling the display apparatus 100 is received from an external device such as a remote controller, the display apparatus 100 may activate a processor in an inactivated state. That is, the display apparatus 100 may convert a mode of the display apparatus 100 from the stand-by mode to the normal mode.

For example, when a signal for turning on the power of the display apparatus 100 is received from an external device such as a remote controller or the like, or when a signal for turning on the power of an external electronic device for transmitting an image signal to the display apparatus 100 is received, the processor in the inactivated state may be activated. Alternatively, the display apparatus 100 may, when a signal to convert a mode of the display apparatus 100 from a stand-by mode to a normal mode is received from an external device such as a remote controller, activate the processor in an inactivated state.

While a plurality of processors are activated, when an image signal is received from the external electronic device, the display apparatus 100 may process the received image signal and display the signal through a plurality of display modules.

While a plurality of processors are activated, when a signal for controlling an external electronic device is received, the display apparatus 100 may transmit a signal to an external electronic device.

As described above, the display apparatus 100 may transmit a signal for controlling an external electronic device received through the IR sensor to an external electronic device connected through the interface.

Accordingly, a user may control the external electronic device while watching an image through the display apparatus 100.

For example, the user may only have to transmit a signal for channel switching to the IR sensor of the display apparatus 100 without a need to input a channel switching command, or the like, to the external electronic device located in a separate space. Therefore, a user may control the external electronic device while watching an image through the display apparatus 100.

Figure 9:
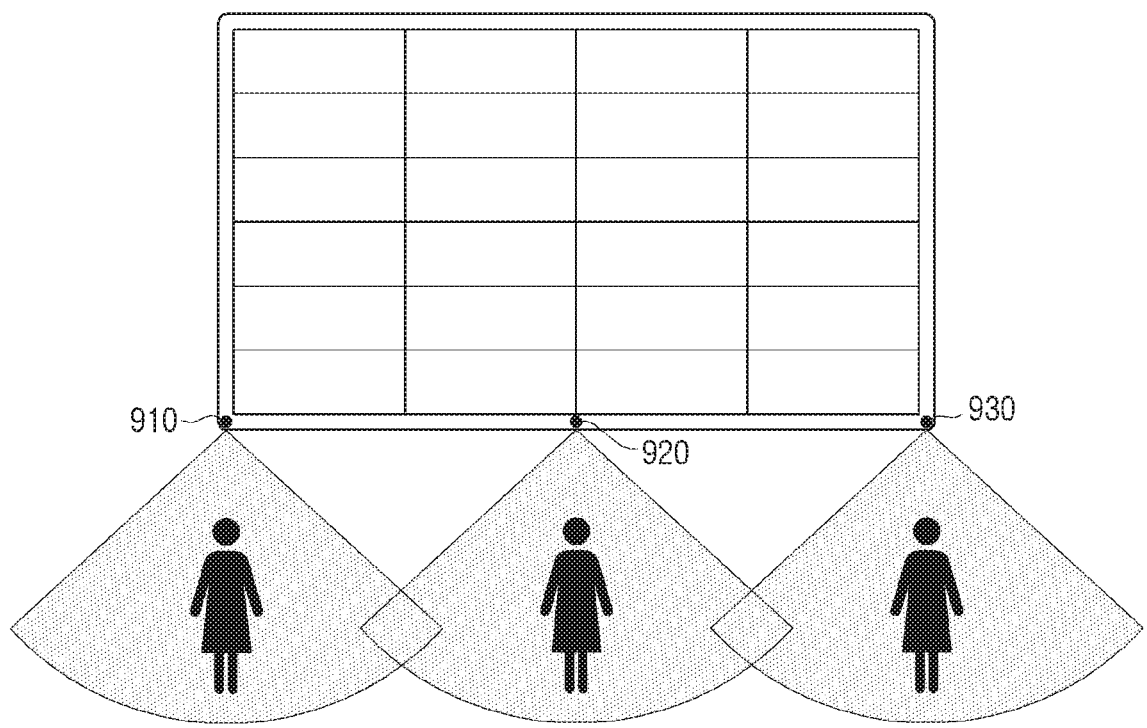
FIG. 9 is a view illustrating a case in which a user is sensed in the vicinity of a display apparatus, according to an embodiment.

FIG. 9 is a view illustrating a case in which a user is sensed in the vicinity of a display apparatus according to an embodiment.

Referring to FIG. 9, the display apparatus 100 may include a plurality of IR sensors 910, 920, and 930.

As described above, each of the plurality of IR sensors may be arranged at different positions. Considering that the display apparatus 100 according to an embodiment may be implemented as a large-sized display device, by arranging a plurality of IR sensors at different regions, there is an effect that the display apparatus 100 may detect a user in the vicinity of the display apparatus 100 without a blind area where a user in the vicinity of the display apparatus 100 is not detected.

While the display apparatus 100 is operating in the stand-by mode, when the user in the vicinity of the display apparatus 100 is sensed by the sensor, the display apparatus 100 may activate the processor in the inactivated state. That is, the display apparatus 100 may switch the mode of the display apparatus 100 from the stand-by mode to the normal mode.

While the plurality of processors are activated, when an image signal is received from the external electronic device, the display apparatus 100 may process the received image signal and display the signal through a plurality of display modules.

As such, when a user is detected in the vicinity of the display apparatus 100, the display apparatus 100 activates a processor in advance, and user's felt booting speed may be accelerated.

In addition, before a user is detected, a stand-by mode is maintained, and thus, the display apparatus 100 may save power use.

Figure 10:
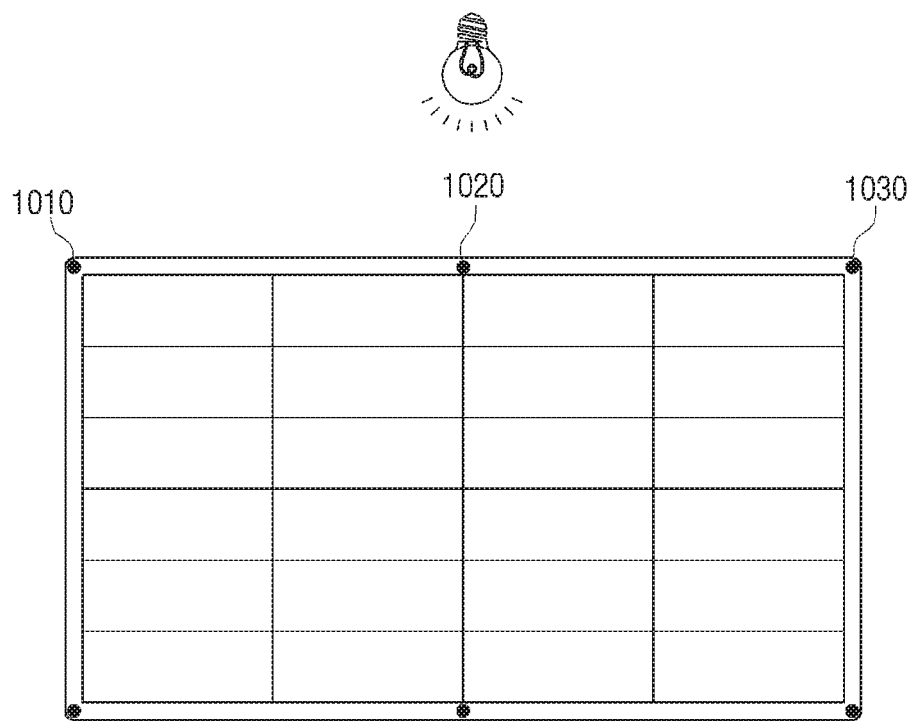
FIG. 10 is a view illustrating a case in which brightness in the vicinity of a display apparatus is changed, according to an embodiment.

FIG. 10 is a view illustrating a case in which brightness in the vicinity of a display apparatus is changed, according to an embodiment.

Referring to FIG. 10, the display apparatus 100 may include a plurality of IR sensors 1010, 1020, and 1030.

As described above, each of the plurality of IR sensors may be arranged at different positions. Considering that the display apparatus 100 according to an embodiment may be implemented as a large-sized display device, a plurality of IR sensors may be arranged at different regions, and there is an effect that the display apparatus 100 may detect a change in a brightness value in the vicinity of the display apparatus 100 more accurately.

While the display apparatus 100 is operating in the stand-by mode, when brightness that is greater than or equal to a predetermined threshold value is detected, the processor in the inactivated state may be activated. That is, the display apparatus 100 may convert the mode of the display apparatus 100 from the stand-by mode to the normal mode.

For example, when the power of a lighting device installed in a space where the display apparatus 100 is located is turned on, the display apparatus 100 may switch the mode of the display apparatus 100 from the stand-by mode to the normal mode.

While a plurality of processors are activated, when an image signal is received from an external electronic device, the display apparatus 100 may process the received image signal and display the image signal through a plurality of display modules.

As such, in the case where brightness of a predetermined threshold value or more is sensed, the possibility that the user is located in the vicinity of the display apparatus 100, such as the case when the user turns on the power of the lighting device in the vicinity of the display apparatus 100 is reflected, and thus, the display apparatus 100 activates the processor in advance and the user's felt booting speed may be accelerated.

Figure 11:
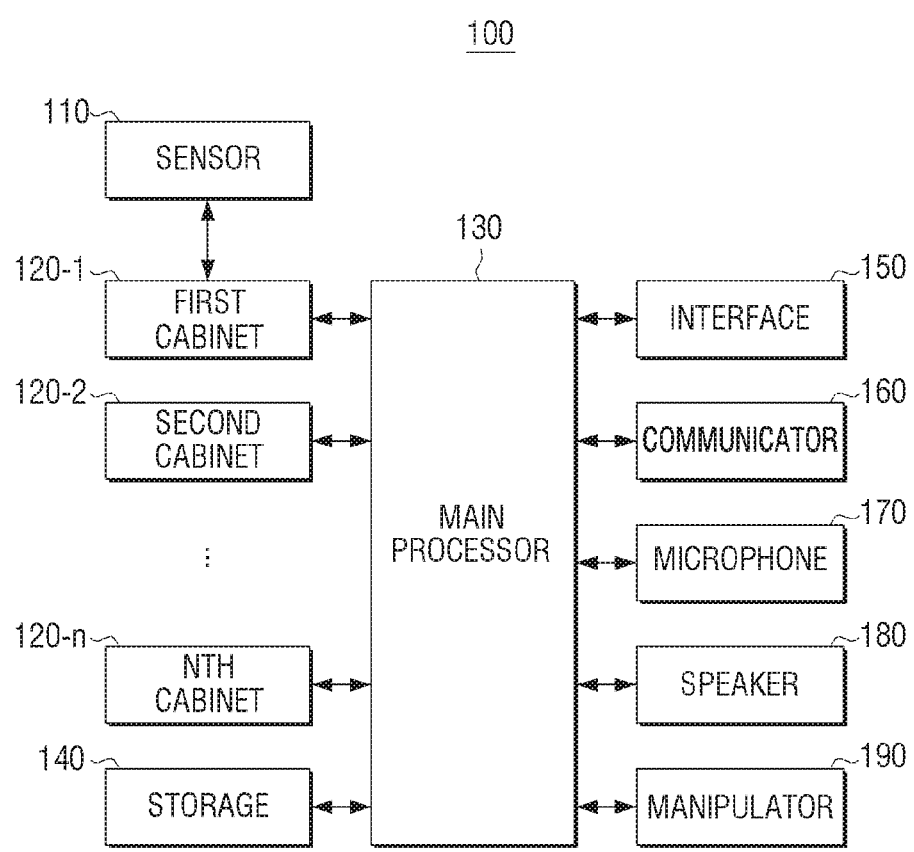
FIG. 11 is a detailed block diagram to describe a display apparatus according to an embodiment.

FIG. 11 is a detailed block diagram to describe a display apparatus, according to an embodiment.

Referring to FIG. 11, the display apparatus 100 according to an embodiment may include the sensor 110, a first cabinet 120-1, a second cabinet 120-2, an nth cabinet 120-n, a storage 140, an interface 150, a communicator 160, a microphone 170, a speaker 180, a manipulator 190, and the main processor 130. The parts overlapping with the above description will be omitted or shortened.

The storage 140 may store an operating system (OS) for controlling overall operations of the component of the display apparatus 100 and a command or data related to the components of the display apparatus 100.

Accordingly, the main processor 130 may control a plurality of hardware or software components of the display apparatus 100 using various commands or data stored in the storage 140, load and process a command or data received from at least one of the other components in a volatile memory, and store various data in the non-volatile memory.

The storage 140 may be implemented as various types of storage medium. For example, the storage 140 may be implemented as non-volatile memory such as a read only memory (ROM), programmable read only memory (PROM), erasable programmable read only memory (EPROM), flash memory, or a volatile memory such as a random access memory (RAM), or a storage device such as a hard disk, an optical disk, and the like.

The main processor 130 controls overall operations of the display apparatus 100. The main processor 130 may be included in the external electronic device connected to the display apparatus 100 and may be included inside the display apparatus 100. For example, the main processor 130 may be a main processor included in a media box included in FIG. 6 or FIG. 7.

Specifically, the main processor 130 may drive an operating system or an operating program to control hardware or software components connected to the main processor 130, and perform various data processing and operations. The main processor 130 may load and process a command or data received from at least one of other components in the volatile memory, and store various data in non-volatile memory.

The main processor 130 may be implemented as a dedicated processor (for example, an embedded processor) for performing a corresponding operation or a generic-purpose processor (for example, a CPU or an application processor)

to perform the operations, by executing one or more software programs stored in a memory device.

In a normal mode in which the processor included in each of the plurality of cabinets is activated, the main processor 130 may control a plurality of processors to display an image corresponding to an image signal received from an external electronic device through each of a plurality of display modules, or control a plurality of processors to display an image prestored in the display apparatus 100 through each of a plurality of display modules.

After an image is displayed through a plurality of display modules and a signal is not received from the sensor 110 during a predetermined time, the main processor 130 may control a processor included in each of the plurality of cabinets so as to switch a mode of the display apparatus 100 from a normal mode to a stand-by mode. Here, the predetermined time may be set in a diverse manner, such as 60 minutes, 120 minutes, or the like, according to a user command.

Specifically, the main processor 130 may display an image through a plurality of display modules and then, if a signal is not received from the sensor 110 for a predetermined time, the main processor 130 may inactivate a processor included in each of the plurality of cabinets.

A case where a signal is not received from the sensor for a predetermined time or longer means a case in which a user does not watch an image through the display apparatus 100, or a user is out of the vicinity of the display apparatus 100, and here, a mode of the display apparatus may be converted to a stand-by mode, to reduce power consumption.

The display apparatus 100 according to an embodiment may perform a different operation according to which signal is not received for a predetermined time or more from the sensor.

Specifically, after displaying an image through a plurality of display modules, the main processor 130, when a signal for controlling an external electronic device is not received from the sensor 110 for a predetermined time, may convert a normal mode to a stand-by mode.

In this case, the main processor 130 may display a user interface (UI) indicating that a mode will be converted to a stand-by mode through a screen, before converting the mode to the stand-by mode.

When the mode is converted to the stand-by mode, the main processor 130, upon receiving a signal for controlling an external electronic device from a sensor, may convert the mode of the display apparatus 100 from the stand-by mode to the normal mode.

Even when a user is detected in the vicinity the display apparatus 100, the main processor 130 may not convert the mode of the display apparatus 100 from the stand-by mode to the normal mode.

If a signal for controlling the external electronic device is not received for a predetermined time or longer, it is highly likely that a user would not be watching an image even if the user is in the vicinity of the display apparatus 100. For example, the user may fall asleep near the display apparatus 100 after playing the image through the display apparatus 100.

After an image is displayed through a plurality of display modules, if a user is not sensed from the sensor 110 for a predetermined time, the main processor 130 may convert the normal mode to the stand-by mode.

In this case, the main processor 130 may display a UI through a screen that the mode will be converted to the stand-by mode, before converting to the stand-by mode.

If the mode is converted to the stand-by mode, and a signal for controlling an external electronic device is received from the sensor, the main processor 130 may convert a mode of the display apparatus 100 from the stand-by mode to the normal mode.

The main processor 130, even when a user is sensed in the vicinity of the display apparatus 100, may convert the mode of the display apparatus 100 from the stand-by mode to the normal mode.

This case reflects that, when a user who has not been sensed in the vicinity of the display apparatus 100 is sensed, a user is highly likely to move to the vicinity of the display apparatus 100 with an intention to watch an image.

The communicator 160 may communicate with an external device and transceive various data. For example, the communicator 160 may communicate with an external device such as a smart phone, or the like, to receive a signal for controlling the display apparatus 100 or a signal for controlling the external electronic device. For this purpose, the communicator 160 may include a wireless communication chip, a Wi-Fi chip, a Bluetooth chip, or the like.

A microphone phone 170 may receive a user voice. Here, the user voice may be a voice for executing a specific function of the display apparatus 100.

When a user voice for executing a specific function is received through the microphone 170, the main processor 130 may convert a user voice to a digital signal through a speech to text (STT) algorithm and provide response information corresponding to a user voice. Here, the response information may be received through an external server, and generated by the display apparatus 100 itself.

The speaker 180 is a component outputting various audio data on which various processes such as decoding, amplification, noise filtering, and the like, are performed by an audio processor. In addition, the speaker 180 may output various notification sounds or a voice message. According to an embodiment, the speaker 180 may output an audio signal when the mode of the display apparatus 100 is converted.

A manipulator 190 may be implemented as a touch screen, a touch pad, a key button, a key pad, or the like.

The display apparatus 100 may further include a USB port to which a USB connector may be connected, various external input ports for connecting to various external terminals, such as a headset, mouse, LAN, a digital multimedia broadcasting (DMB) chip for receiving and processing the DMB signal, or the like.

The display apparatus 100 may further include a broadcast receiver for receiving a broadcast signal from a broadcasting station of a satellite by wire or wirelessly, a signal separator for separating a broadcast signal received from the broadcast receiver into an image signal, an audio signal, and an additional information signal, and an audio/video processor for performing video decoding and video scaling for an image signal and performing audio decoding for an audio signal, or the like.

Figure 12:
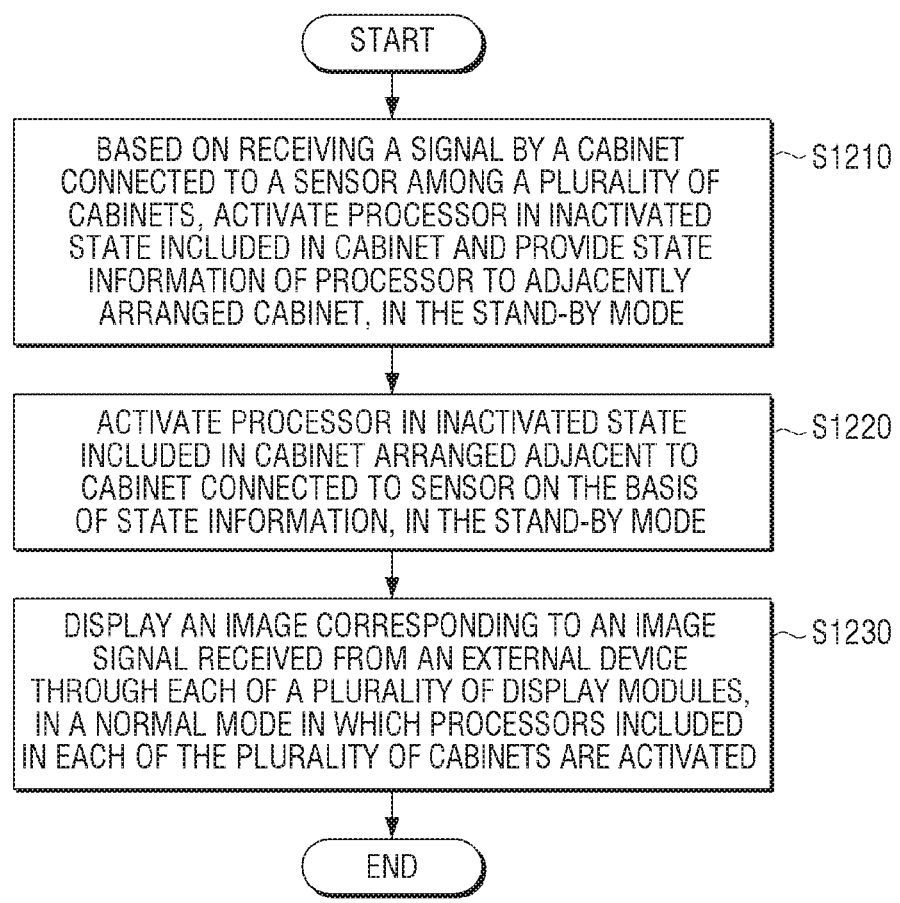
FIG. 12 is a flowchart to describe an operation of a display apparatus according to an embodiment.

FIG. 12 is a flowchart to describe an operation of a display apparatus according to an embodiment.

The display apparatus according to an embodiment may include at least one display module, and include a plurality of cabinets which are arranged to be adjacent to each other and configure a screen of the display apparatus.

When a signal is received from the sensor in the cabinet connected to the sensor among the plurality of cabinets in the stand-by mode, the display apparatus may activate the processor in the inactivated state included in the cabinet, and provide the state information of the processor to the adjacently arranged cabinet in operation S1210.

Here, the stand-by mode indicates a state in which the sensor and the sub-processor included in each cabinet are activated, and the display module included in each cabinet and the processor are inactivated. In the stand-by mode, the sub-processor may receive a signal from the sensor.

In the stand-by mode, the display apparatus may activate the processor in the inactivated state included in the cabinet that is arranged adjacently to the cabinet connected to the sensor, based on the state information of the processor included in the cabinet connected to the sensor in operation S1220.

To be specific, the sub-processor included in the cabinet connected to the sensor may output a low signal when the processor is in an inactivated state, and output a high signal when the processor is in an activated state.

That is, when a signal is not received from the sensor, the sub-processor included in the cabinet connected to the sensor may output a low signal, and when a signal is received from the sensor, the sub-processor may convert a low signal to a high signal and output the converted signal.

The sub-processor included in the adjacently-arranged cabinet may determine whether the processor included in the cabinet connected to the sensor is in an activated state or an inactivated state, based on whether the signal output by the sub-processor included in the cabinet connected to the sensor is a low signal or a high signal.

Specifically, if the signal output by the sub-processor included in the cabinet connected to the sensor is a low signal, the sub-processor included in the adjacently arranged cabinet may determine that the processor included in the cabinet connected to the sensor is in the inactivated state, and if the signal output by the sub-processor included in the cabinet connected to the sensor is a high signal, the sub-processor may determine that the processor included in the cabinet connected to the sensor is in the activated state.

When it is determined that the processor included in the cabinet connected to the sensor is in the inactivated state, the sub-processor included in the adjacently arranged cabinet may maintain the inactivated state of the processor, and when it is determined that the processor included in the cabinet connected to the sensor is in the activated state, the sub-processor may activate the processor in the inactivated state.

Accordingly, when the processor included in the cabinet connected to the sensor is activated, the processor included in the adjacently-arranged cabinet may be activated as well.

In the normal mode in which the processor included in each of the plurality of cabinets is activated, the display apparatus may display an image corresponding to an image signal received from the external electronic device through each of the plurality of display modules in operation S1230.

Specifically, the processor included in each cabinet may process an image signal received from the external electronic device and display an image through a display module, or display an image prestored in the display apparatus through the display module.

The methods according to various embodiments may be implemented as a format of software or application installable to a related art display apparatus.

The methods according to various embodiments may be implemented by software upgrade of a related art electronic apparatus, or hardware upgrade only.

The various embodiments described above may be implemented through an embedded server provided in the electronic apparatus or a server outside the electronic apparatus.

A non-transitory computer readable medium which stores a program for sequentially executing a method for controlling an electronic apparatus according to an embodiment may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

According to the one or more embodiments, even an external electronic device which is located at a separate space may be controlled through a display apparatus. Further, in the stand-by mode, there is an effect of minimizing power consumption by inactivating a sub-processor.

Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
  an interface;
  a plurality of cabinets, each cabinet of the plurality of cabinets including a display module, a sub-processor configured to be activated in a stand-by mode, and a processor; and
  at least one sensor,
  wherein a first sub-processor included in a first cabinet connected to the at least one sensor, among the plurality of cabinets, is configured to, based on a signal being received from the at least one sensor in the stand-by mode, activate a first processor included in the first cabinet, and transmit state information of the first processor to a second sub-processor included in a second cabinet that is adjacent to the first cabinet,
  wherein the second sub-processor is configured to activate a second processor included in the second cabinet based on the state information,
  wherein the processor included in each of the plurality of cabinets is configured to, in a normal mode in which the processor included in each of the plurality of cabinets is activated, control the display module included in each of the plurality of cabinets to display an image corresponding to an image signal received from an external electronic device, and
  wherein the first cabinet is connected to the external electronic device through the interface, and the first sub-processor is configured to transmit the state information to the external electronic device through the interface for activating the external electronic device.

2. The display apparatus of claim 1, wherein the first sub-processor is further configured to, based on a signal being received from the at least one sensor, convert the signal from low to high, and output the converted signal, and
  wherein the second sub-processor is further configured to, based on the converted signal output by the first sub-processor being converted from low to high, activate the second processor.

3. The display apparatus claim 1, wherein the first sub-processor is further configured to, based on a signal output by the external electronic device being converted from low to high, activate the first processor.

4. The display apparatus of claim 1, wherein the at least one sensor comprises an infrared (IR) sensor, and
wherein the first sub-processor is further configured to, based on a signal for controlling the display apparatus being received through the IR sensor or a user being sensed in a vicinity of the display apparatus by the IR sensor, activate the first processor.

5. The display apparatus of claim 1, wherein the at least one sensor comprises an illuminance sensor, and
wherein the first sub-processor is further configured to receive a signal including brightness information in a vicinity of the display apparatus from the illuminance sensor and activate the first processor.

6. The display apparatus of claim 1, wherein, based on the signal not being received from the at least one sensor for a predetermined time after the image is displayed, the processor included in each of the plurality of cabinets converts a mode of the display apparatus from the normal mode to the stand-by mode.

7. The display apparatus of claim 1, wherein the first sub-processor is further configured to, based on a signal for converting a mode of the display apparatus to a stand-by mode being received from the at least one sensor, inactivate the first processor, and transmit the state information of the first processor to the second sub-processor, and
wherein the second sub-processor is further configured to inactivate the second processor in an activated state included in the second cabinet using the state information.

8. The display apparatus of claim 7,
wherein the first cabinet is connected to the external electronic device through the interface, and the first cabinet is configured to transmit the state information to the external electronic device through the interface so that the external electronic device in an activated state is inactivated.

9. The display apparatus of claim 8, wherein the first sub-processor is further configured to, based on a signal output by the external electronic device being converted from high to low, inactivate the first processor.

10. A controlling method of a display apparatus comprising a plurality of cabinets, each cabinet of the plurality of cabinets including a display module, a sub-processor, and a processor, the controlling method comprising:
based on receiving a signal, from a sensor, by a first sub-processor included in a first cabinet connected to the sensor, among the plurality of cabinets, activating a first processor included in the first cabinet, and transmitting state information of the first processor to a second cabinet that is adjacent to the first cabinet;
activating a second processor included in the second cabinet based on the state information; and
in a normal mode in which the processor included in each of the plurality of cabinets is activated, displaying an image corresponding to an image signal received from an external electronic device through the display module included in each of the plurality of cabinets,
wherein the first cabinet is connected to the external electronic device through the interface, and the first sub-processor is configured to transmit the state information to the external electronic device through the interface for activating the external electronic device.

11. The controlling method of claim 10, further comprising:
converting, by the first sub-processor, based on a signal being received from the sensor, the signal from low to high, and outputting the converted signal, and
activating, by the second cabinet, based on the converted signal output by the first sub-processor being converted from low to high, the second processor.

12. The controlling method of claim 10, further comprising:
activating, by the first cabinet, based on a signal output by the external electronic device being converted from low to high, the first processor.

13. The controlling method of claim 10, wherein the sensor comprises an infrared (IR) sensor, and
the controlling method further comprises:
activating, by the first sub-processor, the first processor based on a signal for controlling the display apparatus being received through the IR sensor or a user being sensed in a vicinity of the display apparatus by the IR sensor.

14. The controlling method of claim 10, wherein the sensor comprises an illuminance sensor, and
the controlling method further comprises:
receiving, by the first sub-processor, a signal including brightness information in a vicinity of the display apparatus from the illuminance sensor, and activating the first processor.

15. The controlling method of claim 10, further comprising:
based on the signal not being received from the sensor for a predetermined time after the image is displayed, converting a mode of the display apparatus from the normal mode to the stand-by mode.

16. The controlling method of claim 10, further comprising:
inactivating, by the first sub-processor, based on a signal for converting a mode of the display apparatus to a stand-by mode being received from the sensor, the first processor, and transmitting the state information of the first processor to the second cabinet, and
inactivating, by the second cabinet, the second processor in an activated state included in the second cabinet using the state information.

17. The controlling method of claim 16, further comprising:
connecting the first cabinet to the external electronic device, and transmitting the state information to the external electronic device so that the external electronic device in an activated state is inactivated.

18. The controlling method of claim 17, further comprising:
inactivating, by the first cabinet, based on a signal output by the external electronic device being converted from high to low, the first processor.

* * * * *